July 8, 1952 — A. J. KEMPPE — 2,602,227

CLAMP FOR HOLDING BAND ON A TOOTH

Filed May 2, 1950

INVENTOR.
ADOLPH J. KEMPPE
BY George B. White
ATTORNEY

Patented July 8, 1952

2,602,227

UNITED STATES PATENT OFFICE 2,602,227

CLAMP FOR HOLDING BAND ON A TOOTH

Adolph J. Kemppe, Santa Rosa, Calif.

Application May 2, 1950, Serial No. 159,515

4 Claims. (Cl. 32—63)

This invention relates to clamps for holding a band upon a tooth.

In filling teeth the filling material for cavities in teeth, particularly plastic filling materials now in use, must be held in the tooth and pressed for several minutes before they set. It is essential that the fillings be held steadily. This is very difficult and causes considerable strain upon a dentist.

The primary object of this invention is to provide clamps which can grip a band on the tooth and hold it steadily together upon the filling and which also prevent longitudinal creeping of the band.

Particularly it is an object of the invention to provide clamps which can be quickly placed upon the band on a tooth and can be positively engaged with this band by projecting piercing points in such a manner as to securely hold the band upon the filling and which can be quickly disengaged or detached from the band.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein.

Figure 1:
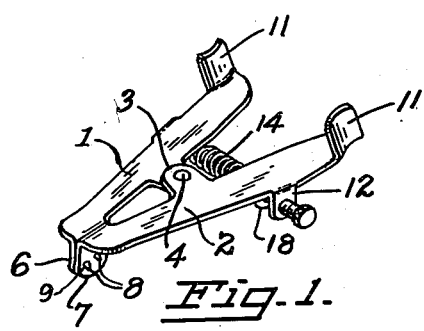
Fig. 1 is a perspective view of a form of a clamp with single jaws.
Figure 5:
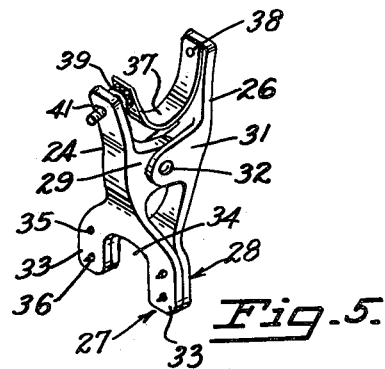
Fig. 5 is a perspective view of a clamp with bifurcated jaws.
Figure 2:
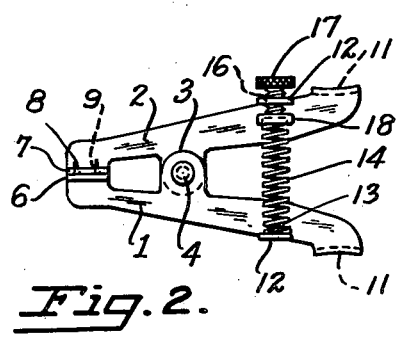
Fig. 2 is a plane view of said clamp in piercing or closed position.
Figure 6:
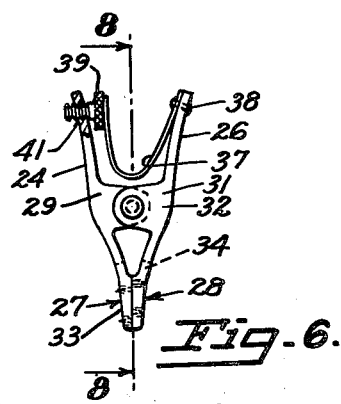
Fig. 6 is a side view of said double clamp.
Figure 3:
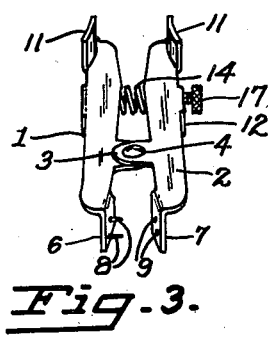
Fig. 3 is a somewhat perspective plane view of this clamp in open position.
Figure 7:
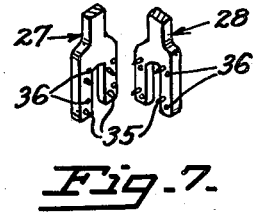
Fig. 7 is a fragmental perspective view showing the arrangement of the points and holes on the jaws of said double clamp.
Figure 8:
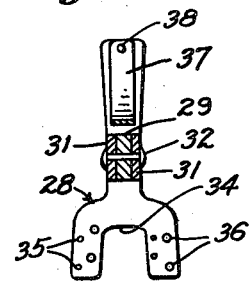
Fig. 8 is a plane view of said double clamp partly in section, the section being taken on the lines 8—8 of Fig. 6.
Figure 4:
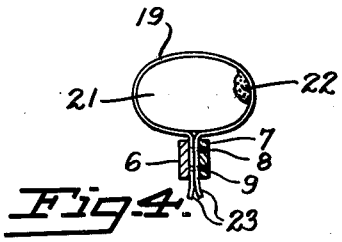
Fig. 4 is a view of the clamp in operative position on a band around a tooth.

In carrying out my invention in the form shown in Figs. 1 to 4 inclusive, I make use of a pair of flat bars 1 and 2, arranged edgewise relatively to one another. Each bar has an ear 3 thereon extended toward the other bar. The ears 3 overlap between the ends of the bars 1 and 2 and are connected by a pivot 4.

At one end of the bar 1 is formed a jaw 6 by a bent down ear and a corresponding jaw 7 is formed on the adjacent end of the other bar 2 so that the jaws 6 and 7 face one another. Out of one of the jaws 6 extend a plurality of tapered piercing points 8. In this illustration I show two points 2. In the other jaw 7 are a pair of holes 9 in registry with the piercing points 8 when the jaws 6 and 7 are together in clamping position. On the other ends of the bars 1 and 2 are lugs 11 extended upwardly viewing Fig. 1 and so arranged that they may be engaged from the outside by a thumb and a finger of a hand for moving them toward one another for the opening of the clamp.

Between the pivot 4 and the lugs 11 are a pair of ears 12, one extended downwardly from each bar. One of the ears 12 has a button 13 thereon to locate the adjacent end of a coil spring 14. The other ear 12 has a threaded hole 16 therein. A set screw 17 is screwed in the threaded hole 16 and has a cup 18 on its inner end in which latter is located the other end of the coil spring 14. In this manner the tension of the coil spring 14 can be easily adjusted by the set screw 17.

In operation a band 19 is placed around the tooth 21 and over the filling 22. The band 19 is made of a flexible strip of suitable plastic, or resin or steel. The ends 23 of the band 19 are held together manually and the jaws 6 and 7 placed over the outsides of the band ends 23 and pressed together by hand so that the piercing points 8 pierce the band ends 23 and hold them tightly in position without allowing either sliding or creeping of the band 19. By pressing the lugs 11 together the jaws 6 and 7 can be separated and the piercing points 8 are thus withdrawn from the band ends 23, allowing the removal of the band 19 from the tooth 21.

In the form shown in Figs. 5 to 9 inclusive, handles 24 and 26 are substantially in a plane generally parallel with the plane of the clamping jaws 27 and 28. A pivot ear 29 extends from one of the handle elements 24 and is straddled by a pair of bearing ears 31 on the other element. A pivot 32 extends through the bearing ears 29 and 31 substantially parallel with the plane of the clamping jaws 27 and 28.

Each of the clamping jaws 27 and 28 is bifurcated, namely it is formed into a yoke with the fingers 33 thereof spaced apart, so as to form a yoke recess 34 to straddle a tooth, one finger of each jaw located in the front and the other clamp finger of each jaw in the back of the tooth. Each finger 33 has a pair of staggered and spaced, tapered piercing points 34. The piercing points 34 of the opposed fingers 33 of the opposed jaws 27 and 28 are staggered with respect to one another. Each of the fingers 33 has a pair of holes 36 therein registering with the respective opposite piercing points 34 and receiving the same when the jaws are together in clamping position.

In this illustration a bow spring 37 is fixed by a pin 38 to the handle end of the handle element 26 and bears against the head of an adjusting screw 39 threaded in a threaded hole 41 in the adjacent end of the other handle element 24. The bow spring 37 has its bow extended inwardly between the handle elements 24 and 26. The free ends of the handle elements 24 and 26 are flat and so curved as to be easily engaged manually for pressing them together for the opening of the clamp. The tension of the bow spring 37 can be adjusted by the turning of the adjusting screw 39.

Figure 9:
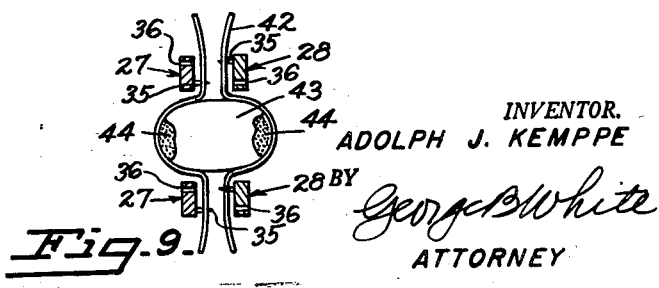
Fig. 9 is a cross sectional view of the double clamp upon a band around the fillings in a tooth.

In operation a pair of bands 42 is extended to the opposite sides of the tooth 43, as shown in Fig. 9, which tooth 43 has fillings 44 on the opposite sides thereof. The ends of the bands 42 extend inwardly in the back and outwardly in the front of the tooth 43. The double clamp is then so placed over the tooth that its jaws 27 and 28 straddle the tooth and engage with the inner and outer ends of the bands 42. The fingers of the jaws 27 and 28 are adapted to be pressed manually together so that the piercing points 34 thereof pierce the respective adjacent bands and press them together as far as it is necessary. The bow spring 37 holds the clamps in position and the pierced bands 42 are thus held on the tooth with suitable pressure.

It is to be noted that the spring tension which urges the handle elements apart and the jaws together is preferably insufficient to pierce the band but is sufficient to hold the clamp in position. It is preferable to accomplish the piercing by manual pressure on the jaws so as to be certain that the band is held in the position as needed.

The device herein described is light and simple. It can be easily used in the mouth of a person and relieves the dentist from the strain of tightly holding a band upon a filling for an extended period manually. The clamp can be easily applied and released without inconvenience either to the patient or to the dentist.

I claim:

1. A clamp for holding a band on a tooth comprising a pair of elements pivoted together, a bifurcated yoke jaw formed on an end of each element, the jaws being opposite to one another, the fingers of said yoke jaws being spaced to straddle a tooth to grip the band in front and at the back of the tooth, piercing points extended from the fingers of the jaws toward the other jaw, the fingers of the other jaw having holes therein to receive the respective points extended through the band and resilient means to urge said jaws together.

2. A clamp for holding a band on a tooth comprising a pair of elements pivoted together, a bifurcated yoke jaw formed on an end of each element, the jaws being opposite to one another, the fingers of said yoke jaws being spaced to straddle a tooth to grip the band in front and at the back of the tooth, piercing points extended from each finger toward the opposite finger in staggered spaced relation for piercing the band between said fingers.

3. A clamp for holding a band on a tooth comprising a pair of elements pivoted together, a bifurcated yoke jaw formed on an end of each element, the jaws being opposite to one another, the fingers of said yoke jaws being spaced to straddle a tooth to grip the band in front and at the back of the tooth, piercing points extended from each finger toward the opposite finger in staggered spaced relation for piercing the band between said fingers, and said fingers having staggered spaced holes thereon in registry with the respective points to receive the latter in clamping position.

4. A clamp for holding a band on a tooth comprising a pair of elements pivoted together, a bifurcated yoke jaw formed on an end of each element, the jaws being opposite to one another, the fingers of said yoke jaws being spaced to straddle a tooth to grip the band in front and at the back of the tooth, piercing points extended from each finger toward the opposite finger in staggered spaced relation for piercing the band between said fingers, and said fingers having staggered spaced holes thereon in registry with the respective points to receive the latter in clamping position, and adjustable means on said elements to resiliently urge said jaws together.

ADOLPH J. KEMPPE.

REFERENCES CITED

The following references are of record in the file of this patent:

UNITED STATES PATENTS

| Number | Name | Date |
|---|---|---|
| 437,877 | Truax | Oct. 7, 1890 |
| 983,844 | Shannon | Feb. 7, 1911 |

FOREIGN PATENTS

| Number | Country | Date |
|---|---|---|
| 208,848 | Switzerland | Feb. 29, 1940 |